(12) United States Patent
Tiyyagura et al.

(10) Patent No.: US 10,860,576 B2
(45) Date of Patent: Dec. 8, 2020

(54) SPLITTING A QUERY INTO NATIVE QUERY OPERATIONS AND POST-PROCESSING OPERATIONS

(71) Applicant: VMware, Inc., Palo Alto, CA (US)

(72) Inventors: Sundeep Tiyyagura, Fremont, CA (US); Mirza Mohsin Beg, Foster City, CA (US); A. Christer Sabelstrom, Monument, CO (US)

(73) Assignee: VMware, Inc., Palo Alto, CA (US)

( * ) Notice: Subject to any disclaimer, the term of this patent is extended or adjusted under 35 U.S.C. 154(b) by 247 days.

(21) Appl. No.: 15/881,364

(22) Filed: Jan. 26, 2018

(65) Prior Publication Data

US 2019/0236182 A1    Aug. 1, 2019

(51) Int. Cl.
*G06F 16/242* (2019.01)
*G06F 16/27* (2019.01)
*G06F 16/2455* (2019.01)

(52) U.S. Cl.
CPC .... *G06F 16/2425* (2019.01); *G06F 16/24558* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 5,060,150 A | 10/1991 | Simor | |
| 6,970,865 B1 | 11/2005 | Plasek et al. | |
| 7,215,970 B2 | 5/2007 | Corrigan et al. | |
| 7,444,679 B2 | 10/2008 | Tarquini et al. | |
| 7,953,571 B2 | 5/2011 | Odaka et al. | |
| 8,291,490 B1 | 10/2012 | Ahmed et al. | |
| 8,375,060 B2 * | 2/2013 | Dewar | G06F 16/245 707/797 |
| 8,498,996 B2 * | 7/2013 | Whitcher | G06F 16/2452 707/759 |
| 8,738,608 B2 * | 5/2014 | Pauly | G06F 16/213 707/716 |

(Continued)

OTHER PUBLICATIONS

Non-Final Office Action received for U.S. Appl. No. 15/881,376, dated Mar. 26, 2020, 13 pages.

(Continued)

*Primary Examiner* — Kim T Nguyen
(74) *Attorney, Agent, or Firm* — Dentons US LLP

(57) ABSTRACT

Techniques for splitting a query into native query operations and post-processing operations are provided. In one embodiment, a user query including a plurality of search parameters is received. Expressions representing the plurality of search parameters in the user query are determined. A first subset and a second subset of the expressions are identified. Each expression of the first subset corresponds to one of a plurality of native query operations executable by a database platform, and each expression of the second subset corresponds to one of a plurality of predefined post-processing operations not executable by the database platform. A database query is generated based on one or more expressions of the first subset, and a post-processing query is generated based on each expression in the second subset. The database query is executed by the database platform, then the post-processing query is executed on the results from database platform.

20 Claims, 7 Drawing Sheets

(56) References Cited

U.S. PATENT DOCUMENTS

| | | |
|---|---|---|
| 8,768,962 B2 | 7/2014 | Laron |
| 9,047,558 B2 | 6/2015 | Hochstein |
| 9,418,101 B2 * | 8/2016 | He .................. G06F 16/283 |
| 9,514,183 B1 | 12/2016 | Alla |
| 9,582,500 B2 * | 2/2017 | McGillin ............. G06F 40/53 |
| 9,712,887 B2 | 7/2017 | Myers et al. |
| 9,717,011 B2 | 7/2017 | Huang et al. |
| 9,817,851 B2 * | 11/2017 | Dumant ............... G06F 16/211 |
| 9,892,237 B2 | 2/2018 | Greenfield |
| 9,898,334 B1 | 2/2018 | Dongare et al. |
| 10,044,578 B2 | 8/2018 | He et al. |
| 10,242,061 B2 * | 3/2019 | Luo .................. G06F 16/2455 |
| 10,445,334 B1 * | 10/2019 | Xiao .................. G06F 16/951 |
| 10,445,479 B2 | 10/2019 | Rao et al. |
| 10,460,277 B2 * | 10/2019 | Dumant ............... G06Q 10/067 |
| 10,496,653 B1 | 12/2019 | Epshteyn et al. |
| 2002/0152254 A1 | 10/2002 | Teng |
| 2004/0002956 A1 | 1/2004 | Chaudhuri et al. |
| 2005/0120062 A1 | 6/2005 | Sinha et al. |
| 2007/0061291 A1 | 3/2007 | Azizi |
| 2007/0078827 A1 | 4/2007 | Sareen et al. |
| 2008/0010268 A1 | 1/2008 | Liao et al. |
| 2012/0060165 A1 | 3/2012 | Clarke |
| 2012/0207046 A1 | 8/2012 | Di et al. |
| 2014/0109097 A1 | 4/2014 | Datla et al. |
| 2014/0143505 A1 | 5/2014 | Sim et al. |
| 2014/0172867 A1 | 6/2014 | Lin et al. |
| 2015/0040121 A1 | 2/2015 | Barabash et al. |
| 2015/0095097 A1 | 4/2015 | Dejardine et al. |
| 2015/0186434 A1 | 7/2015 | Eichinger et al. |
| 2016/0162543 A1 | 6/2016 | Gustafson et al. |
| 2016/0179063 A1 | 6/2016 | De et al. |
| 2017/0004006 A1 | 1/2017 | Mori et al. |
| 2017/0068727 A1 | 3/2017 | Rubin et al. |
| 2017/0177263 A1 | 6/2017 | Das et al. |
| 2018/0103081 A1 | 4/2018 | Fawcett |
| 2018/0137169 A1 | 5/2018 | Zhao |
| 2018/0181632 A1 | 6/2018 | Zarum et al. |
| 2018/0196824 A1 | 7/2018 | Bitincka et al. |
| 2018/0293275 A1 | 10/2018 | P et al. |
| 2018/0329644 A1 | 11/2018 | Das et al. |
| 2019/0155850 A1 | 5/2019 | Shi et al. |
| 2019/0236183 A1 | 8/2019 | Tiyyagura et al. |
| 2019/0236185 A1 | 8/2019 | Tiyyagura et al. |
| 2019/0236197 A1 | 8/2019 | Karlapudi et al. |
| 2019/0266273 A1 | 8/2019 | Karlapudi et al. |
| 2019/0268227 A1 | 8/2019 | Desai |
| 2019/0268401 A1 | 8/2019 | Desai et al. |
| 2019/0286719 A1 | 9/2019 | Morales et al. |

OTHER PUBLICATIONS

Non-Final Office Action received for U.S. Appl. No. 15/881,382, dated Mar. 26, 2020, 13 pages.

Non-Final Office Action received for U.S. Appl. No. 15/881,396, dated Feb. 13, 2020, 13 pages.

Non-Final Office Action received for U.S. Appl. No. 15/908,480, dated Dec. 4, 2019, 13 pages.

Non-Final Office Action received for U.S. Appl. No. 15/908,690, dated Oct. 22, 2019, 15 pages.

Non-Final Office Action received for U.S. Appl. No. 15/908,693, dated Dec. 10, 2019, 25 pages.

\* cited by examiner

SPLITTING A QUERY INTO NATIVE QUERY OPERATIONS AND POST-PROCESSING OPERATIONS

FIELD

The present disclosure relates generally to querying a database platform, and more specifically to splitting a query into native query operations and post-processing operations.

BACKGROUND

Modern distributed information systems are increasingly complex and can include thousands of host computing devices, virtual machines (VMs) and networking components, servicing an even larger number of clients. Components of these systems produce massive volumes of machine-generated log data (application logs, network traces, configuration files, messages, performance data, system state dumps, etc.). Log data provides valuable information to system administrators as they manage these complex systems. Log data can be useful in troubleshooting, discovering trends, detecting security problems, and measuring performance. However, individual logs are difficult for a user to interpret and analyze efficiently.

In practice, unstructured and structured log data is aggregated or ingested from multiple sources, stored, and studied within an analytic framework to provide true operational value. Typically, software agents running on or within various system components aggregate log data as it is generated, and a database platform periodically ingests that data for later search and retrieval.

In order to retrieve specific log data from the database platform for analysis, the database platform is queried, and the results of the query are returned by the database platform. However, the types of queries that are supported by the database platform are limited. As the size and complexity of information systems continue to grow, the increasing volume of log data exacerbates the need for more customizable and efficient techniques for searching and retrieving log data for analysis.

OVERVIEW

Described herein are techniques for splitting a query into native query operations and post-processing operations for execution. In one embodiment, a method for splitting a query into native query operations and post-processing operations for execution includes: at a management plane of a distributed-computing system: receiving a user query including a plurality of search parameters; determining a plurality of expressions representing the plurality of search parameters in the user query; identifying a first subset of the plurality of expressions, wherein each expression of the first subset corresponds to one of a plurality of native query operations executable by a database platform implemented on a data plane of the distributed-computing system; identifying a second subset of the plurality of expressions, wherein each expression of the second subset corresponds to one of a plurality of predefined post-processing operations not executable by the database platform; generating a database query based on one or more expressions of the first subset, wherein the database query corresponds to one or more of the plurality of native query operations executable by the database platform; generating a post-processing query based on each expression in the second subset, wherein the post-processing query corresponds to one or more of the plurality of predefined post-processing operations not executable by the database platform; sending the database query to the data plane for execution by the database platform; receiving, from the data plane, one or more results obtained from the database platform executing the database query; and executing the post-processing query on the one or more results from the data plane.

In some embodiments, the method further includes determining whether a Boolean operation combines a first expression of the first subset with a second expression of the second subset; and in accordance with a determination that a first Boolean operation combines the first expression with the second expression, generating the database query without the first expression; and in accordance with a determination that a second Boolean operation combines the first expression with the second expression, generating the database query with the first expression. In some embodiments, the second subset does not include the first expression, and the method further includes: in accordance with the determination that the first Boolean operation combines the first expression with the second expression, generating the post-processing query further based on the first expression; and in accordance with the determination that the second Boolean operation combines the first expression with the second expression, generating the post-processing query without the first expression. In some embodiments, identifying the first subset of the plurality of expressions further comprises assigning a first indicator to each expression of the first subset, and the method further includes: in accordance with the determination that the first Boolean operation combines the first expression with the second expression, assigning a second indicator to the first expression in lieu of the first indicator. In some embodiments, none of the one or more expressions of the first subset have been assigned the second indicator prior to generating the database query.

In some embodiments, the first subset and the second subset each include a same expression of the plurality of expressions. In some embodiments, each expression of the second subset represents a respective criterion that cannot be satisfied by any of the plurality of native query operations. In some embodiments, determining the plurality of expressions further includes parsing the user query to generate a parse tree having a plurality of nodes, wherein each node of the plurality of nodes represents a respective expression of the plurality of expressions. In some embodiments, each of the plurality of expressions represents a query condition, a query predicate, a query clause, a query operator, a query statement, or a combination thereof.

In some embodiments, the total number of expressions in the one or more expressions used to generate the database query is less than the total number of expressions in the first subset. In some embodiments, generating the database query includes combining two or more expressions of the first subset. In some embodiments, generating the post-processing query comprises combining each expression of the second subset. In some embodiments, the post-processing query is generated using each expression in the second subset and one or more expressions of the first subset.

In some embodiments, executing the post-processing query includes filtering the one or more results from the data plane according to one or more criteria represented by the second subset. In some embodiments, the one or more results from the data plane include a plurality of rows of data, and executing the post-processing query includes: evaluating each row of the plurality of rows of data with the post-processing query; and omitting at least one row of data based on the evaluation.

In some embodiments, the data plane is implemented by one or more data plane containers. In some embodiments, each of the one or more data plane containers include one or more data cores storing information for the database platform. In some embodiments, the one or more results include one or more log event records generated by an information processing system.

In one embodiment, a distributed-computing system for splitting a query into native query operations and post-processing operations for execution includes: one or more processors; and memory storing one or more programs configured to be executed by the one or more processors. The one or more programs stored by the memory include instructions for: at a management plane of the distributed-computing system: accessing a received user query including a plurality of search parameters; determining a plurality of expressions representing the plurality of search parameters in the user query; identifying a first subset of the plurality of expressions, wherein each expression of the first subset corresponds to one of a plurality of native query operations executable by a database platform implemented on a data plane of the distributed-computing system; identifying a second subset of the plurality of expressions, wherein each expression of the second subset corresponds to one of a plurality of predefined post-processing operations not executable by the database platform; generating a database query based on one or more expressions of the first subset, wherein the database query corresponds to one or more of the plurality of native query operations executable by the database platform; generating a post-processing query based on each expression in the second subset, wherein the post-processing query corresponds to one or more of the plurality of predefined post-processing operations not executable by the database platform; sending the database query to the data plane for execution by the database platform; accessing one or more results obtained from the database platform executing the database query; and executing the post-processing query on the one or more results from the data plane.

In one embodiment, a non-transitory computer-readable storage medium storing one or more programs configured to be executed by one or more processors is provided. The one or more programs stored by the non-transitory computer-readable storage medium include instructions for: at a management plane of a distributed-computing system: accessing a received user query including a plurality of search parameters; determining a plurality of expressions representing the plurality of search parameters in the user query; identifying a first subset of the plurality of expressions, wherein each expression of the first subset corresponds to one of a plurality of native query operations executable by a database platform implemented on a data plane of the distributed-computing system; identifying a second subset of the plurality of expressions, wherein each expression of the second subset corresponds to one of a plurality of predefined post-processing operations not executable by the database platform; generating a database query based on one or more expressions of the first subset, wherein the database query corresponds to one or more of the plurality of native query operations executable by the database platform; generating a post-processing query based on each expression in the second subset, wherein the post-processing query corresponds to one or more of the plurality of predefined post-processing operations not executable by the database platform; providing the database query to the data plane for execution by the database platform; accessing one or more results obtained from the database platform executing the database query; and executing the post-processing query on the one or more results from the data plane.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, information processing systems (e.g., distributed information systems) generate large amounts of log data. When searching a large amount of log data, custom search parameters can aid in locating relevant items. These custom search parameters include query operations, statements, predicates, and/or conditions which are not supported by the database platform. The custom search parameters are used to augment native search parameters that are supported by the database platform. Since the custom search parameters are not supported by the database platform, they are carried out separately from the native search parameters. This separate execution of the custom search parameters typically occurs after the execution of the native search parameters by the database platform. Thus, some of the custom search functions may be referred to as post-processing operations. In order to provide a more efficient and flexible user experience, it is desirable to allow a user to specify a single query for items from the database platform that uses both native search parameters and custom search parameters in the single query. Thus, the present disclosure is directed to various techniques for splitting a single user query into native query operations and post-processing operations.

In some cases, the post-processing operations can be computationally expensive to execute, while the native query operations can be executed more efficiently by the database platform. Thus, the present disclosure is further directed to various techniques for optimizing the query splitting such that native query operations are maximized to improve efficiency and reduce the overall expense of executing a user query.

Figure 1A:
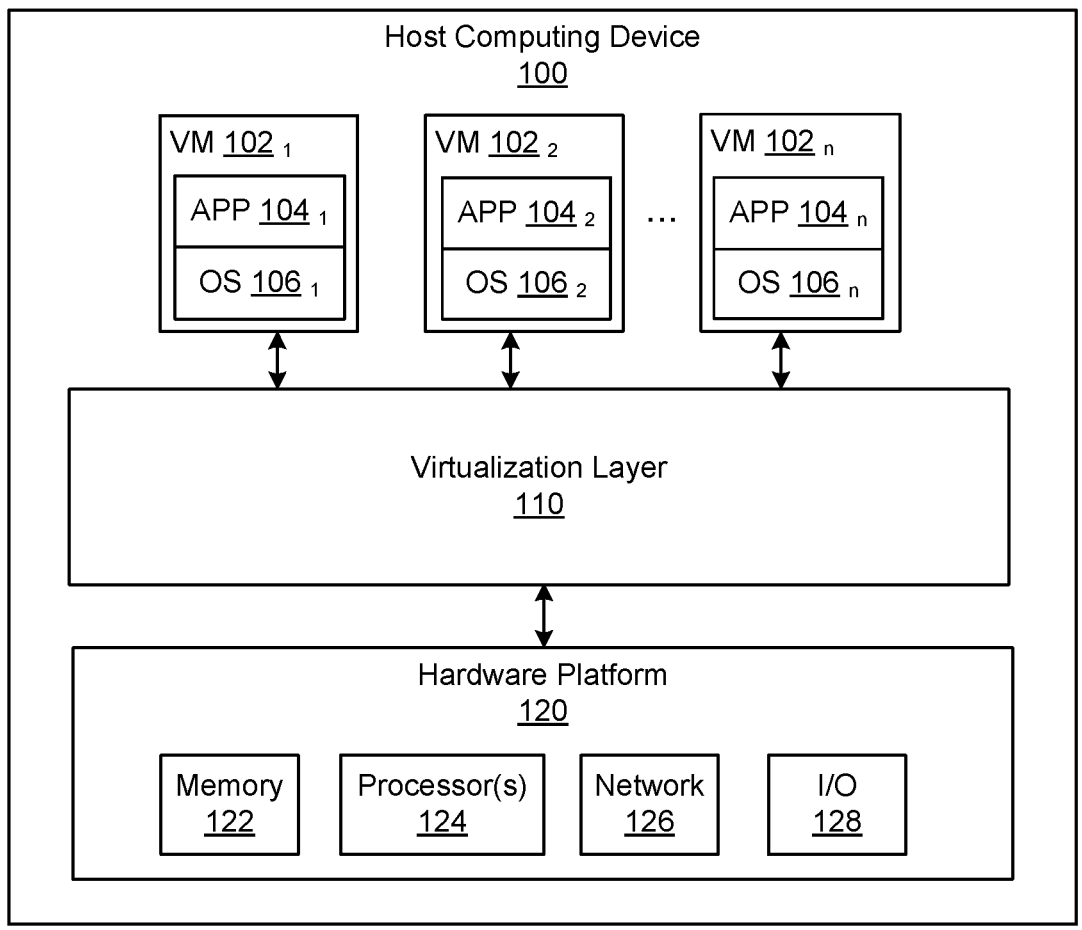
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown, virtual machines (VMs) $102_1$, $102_2$ ... $120_n$ are instantiated on host computing device 100. In some embodiments, host computing device 100 implements one or more elements of a distributed-computing system (e.g., distributed-computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
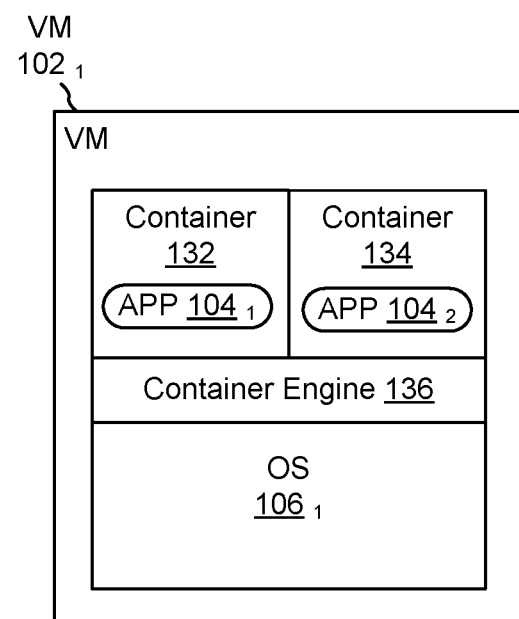
FIG. 1B is a block diagram illustrating a containerized application framework for implementing various components of a distributed-computing system, in accordance with some embodiments.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
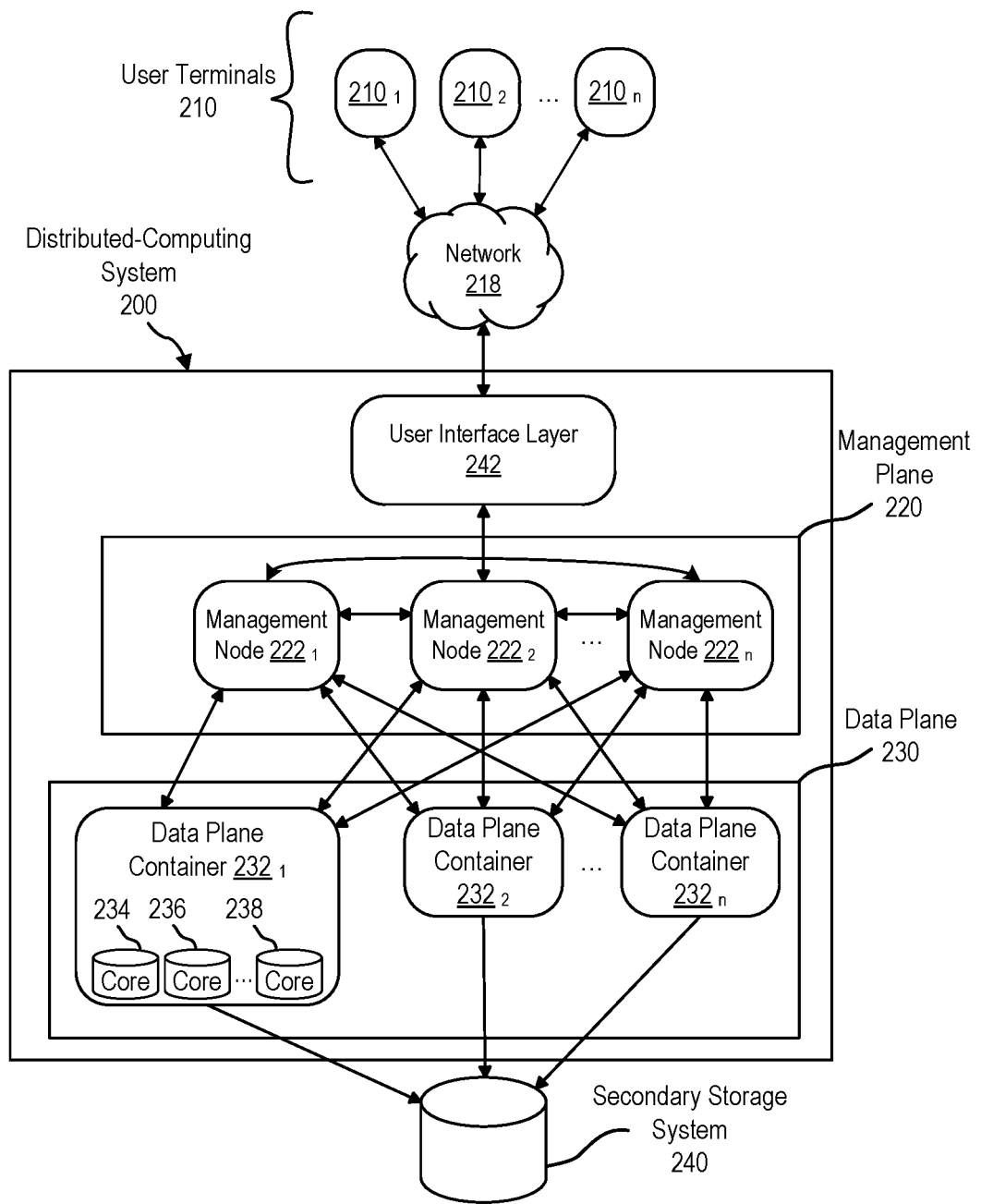
FIG. 2 illustrates systems and environment for searching and retrieving data stored in distributed-computing system, in accordance with some embodiments.

FIG. 2 illustrates systems and environment for searching and retrieving data stored in distributed-computing system 200, in accordance with some embodiments. As shown, user terminals 210 are coupled to distributed-computing system 200 through one or more communication networks 218. In particular, user terminals 210 communicate with user interface layer 242 of distributed-computing system 200 via communication networks 218. The user interface layer 242 is configured to provide user interface functionalities via user terminals 210. The functionalities include, for example, searching for items stored by distributed-computing system 200, displaying results of a query, analyzing results of a query, etc. In some embodiments, the user interface layer 242 runs on a dedicated physical host, as an application within a virtual machine, within a software container on a dedicated host, within a software container on a virtual machine, or any combination thereof. The user interface layer 242 is coupled to management plane 220 of distributed-computing system 200. In some embodiments, user terminals 210 communicate with management plane 220 via user interface layer 242. In some embodiments, additional hardware and software components facilitate the transmission of data between user terminals 210 and management plane 220. For example, data can pass through a proxy server or load balancer before arriving at management nodes 222 within management plane 220.

Examples of communication network(s) 218 include local area networks (LAN) and wide area networks (WAN), e.g., the Internet. Communication network(s) 118 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol. Further, it appreciated that, in some embodiments, physical communication networks, such as described above, are also be implemented as a software defined networks (SDN) or through software emulation.

Distributed-computing system 200 includes management plane 220 and data plane 230. The terms "management plane" and "data plane" refer to functional descriptions of elements of distributed-computing system 200 that perform specialized functions. Management plane 220 implements all business and management logic which allow an administrator to configure distributed-computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 is also configured to, for example, perform packet switching, filtering, tagging, routing logic, and the like. In some embodiments, management plane 220 provides a single API entry point to distributed-computing system 200.

Management plane 220 includes one or more management nodes 222. Each management node 220 is an instantiation of management software (e.g. an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to the data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g. $222_1$) experiences a failure, another management node (e.g. $222_2$) can takeover to maintain management functionality.

Data plane 230 is coupled to management plane 220. Data plane 230 is configured to perform data processing functionality. In some embodiments, data plane 230 includes a database platform configured to ingest data received from management plane 220 and query stored data. The database platform is, for example, an Apache Solr™-based platform (developed by the Apache Software Foundation) that includes one or more Solr™ instances. The data plane 230 implements a database platform that provides database search functionality, such as text searching, hit highlighting, faceted searching, and indexing of items. A predetermined query language is used to carry out the search functionality provided by the database platform. The predetermined query language includes a limited set of predetermined native query operations that the database platform supports. This limited set of predetermined native query operations can be augmented with additional post-processing operations not supported by the database platform. The post-processing operations are executed separately from the database platform by management plane 220.

Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM $102_1$ on host computing device 100. Each data plane container 232 is associated with one or more data cores (e.g. cores 234, 236, and 238). A data core is an allocation of storage resources for files associated with a single tenant or customer. In some embodiments, a core spans one or more storage medias such as hard disks, solid state drives, virtual storage area network devices (VSANs), or the like. In some embodiments, each data core includes a database index with configuration, such as schema, caching, and the like. For example, each data core includes a set of memory structures that manages database files for a database platform. In a specific example, each data core comprises a Solr™ core that includes a Lucene™ index.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

User terminals 210 provide access to distributed-computing system 200. In some embodiments, user terminals 210 send queries to distributed-computing system 200 and receive data (e.g., log data) from distributed-computing system 200 as specified by the queries. For example, in operation, a user (e.g., administrator) accesses, via user terminals 210, user interfaces provided by user interface layer 242 and enters a user query. The user query includes one or more criteria, such as a time range and a text string. Management plane 220 receives the user query from the user interface layer 242 and processes the user query. In particular, management plane 220 generates, from the user query, a database query corresponding to one or more native query operations and sends the database query to data plane 230 for execution. Data plane 230 executes the database query using the one or more native query operations to search the database indexes of the data cores. Data plane 230 then returns search results to management plane 220. Management plane 220 is configured to apply additional post-processing operations (e.g., operations not supported by the database platform implemented in the data plane 230) on the search results to satisfy the user query, and final results are obtained upon applying the post-processing operations. The final results are returned to user interface layer 242 and displayed via the user terminals 210.

Although in the present embodiment, distributed-computing system 200 includes management plane 220 and data plane 230, it should be recognized that, in other embodiments, distributed-computing system 200 can include additional functional layers. For example, distributed-computing system 200 can include additional software layers (e.g., applications) that facilitate functions related to providing alerts or notifications. In some embodiments, distributed-computing systems 200 includes additional intermediate software layers for handling ingestion request or user queries.

Figure 3:
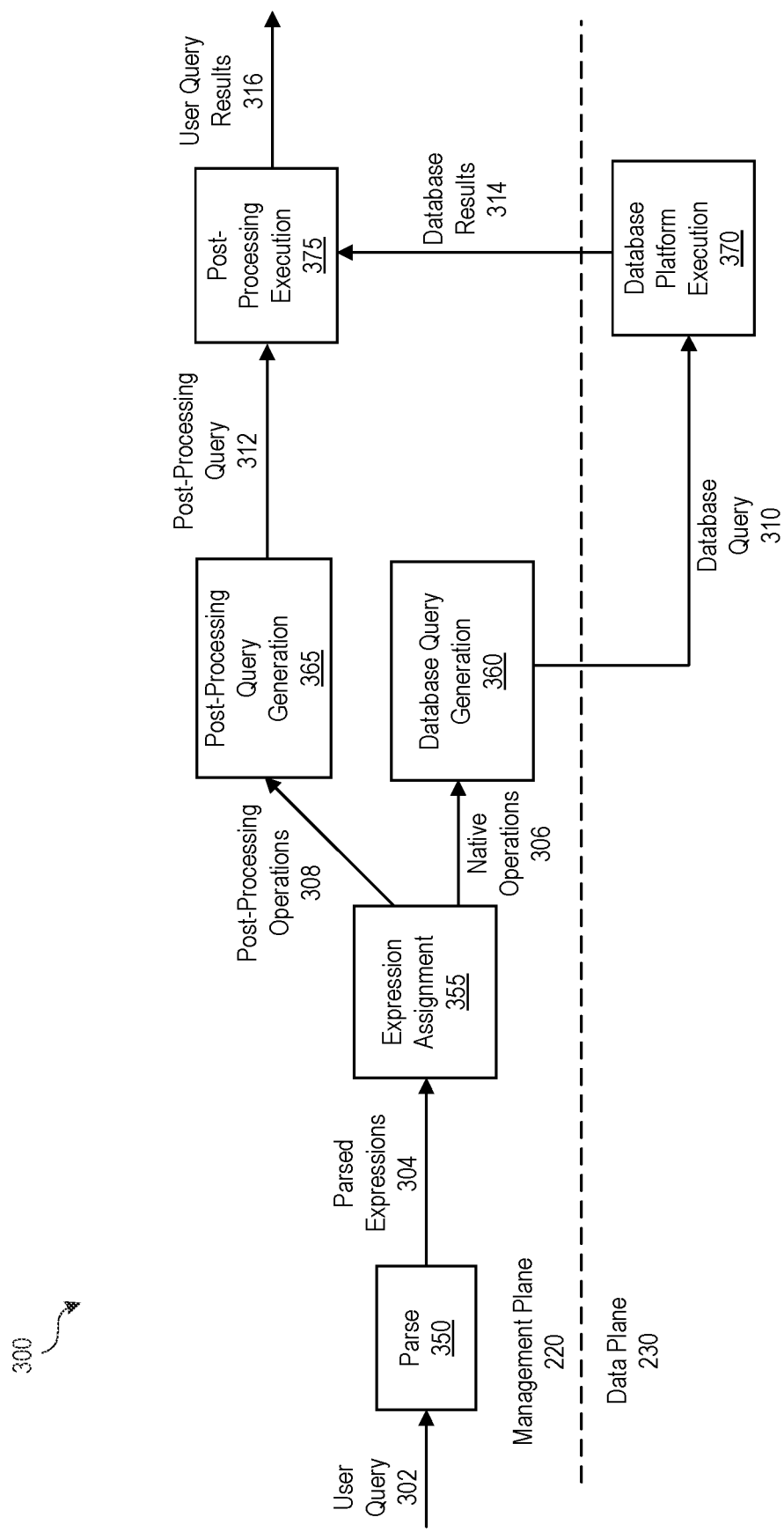
FIG. 3 illustrates a flow diagram of exemplary process executing a query with a distributed-computing system, in accordance with some embodiments.

FIG. 3 illustrates a flow diagram of exemplary process 300 executing a query, in accordance with some embodiments. Process 300 is performed, for example, using a distributed-computing system 200 as described in reference to FIG. 2. In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, a management plane 220 and a data plane 230. In some embodiments, the operations of process 300 are distributed across the various components (e.g., management plane, data plane, etc.) of the distributed-computing system.

While process 300 is described in the context of a distributed-computing system implementing a database platform, it should be understood that process 300 can be applied to other implementations of a database platform, such as a database platform implemented on a single server or local computer.

User query 302 includes search parameters specifying one or more native query operations and one or more post-processing operations. Native query operations include operators, statements, clauses, predicates, and/or conditions supported natively by a database platform implemented in a data plane. When native query operations are provided to a database platform, the database platform includes processes to execute the native query operations and retrieve corresponding results. For a SQL-based database platform, examples of native query operations include SELECT commands, GROUP BY commands, FROM clauses, WHERE clauses, AND operators, OR operators, and so on. Post-processing operations are operators, statements, predicates, clauses, and/or conditions which are not supported by the database platform. These post-processing operations provide additional searching functionality for user query 302 beyond the capabilities of the database platform.

Examples of post-processing operations include specifying dynamic fields, searching text fields with "startsWith", "doesNotStartWith", or "matchesRegex" functions, searching any field with "exists" and "doesNotExist" functions, and performing searches with wildcards (*) in predicate values.

Dynamic fields allow for the definition of new custom fields extracted from raw text of an item in the database (for example, raw log event text). The raw text is selected by specifying a regular expression ("regex") and a field type as part of the dynamic field definition. From the user perspective, a dynamic field operates the same as a regular field. Operations that are possible using regular fields like filtering, group by, order by, aggregations, custom search parameters, and native search parameters are supported using dynamic fields as well. For example, if multiple items in the database include the text string "Added [NUMBER] messages to index", where [NUMBER] can be a different numeric value for each item, then [NUMBER] can be extracted as a dynamic field, and the items in the database that have the string "Added [NUMBER] messages to index" can be sorted by the value of [NUMBER].

Wildcard (*) support in predicate values allows a wildcard (*) to be added at the end of text field predicate values. This allows for the searching of a value that is not a full tokenized value in the database platform. For example, if an item in the database contains the text "analytics process is starting slow", the database platform stores this string in a tokenized way in its index, split by space and punctuation marks. In other words, the distinct values "analytics", "process", "is", "starting", "slow" are stored in the index of the database platform. If the database platform receives a query specifying a search for the text string "analytics proc", the database platform cannot match directly the text string to any value in the index, as the value "proc" does not match any token fully. So, in this case, a wildcard (*) is used which specifies the text string as "analytics proc*", and the search for the text string is executed as a post-processing operation.

The functions "startsWith", "doesNotStartWith", and "matchesRegex" similarly provide support for more flexible searching of text fields. The "startsWith" function identifies items with text in a text field beginning with the text specified by the "startsWith" function. In other words, the "startsWith" function identifies items having first characters in the text field being searched that match the characters specified by the "startsWith" function. An example of a user query 302 including the "startsWith" function is as follows:

```
SELECT vmw_vr_ops_clusterrole
, hostname
FROM xyz
WHERE vmw_vr_ops_clusterrole <> startsWith('DA')
```

The "doesNotStartWith" function identifies items that do not have text in a text field beginning with the text specified by the "doesNotStartWith" function. The "matchesRegex" function identifies items with text in a text field that matches a specified regular expression ("regex"). An example of a user query 302 including the "startsWith" function is as follows:

```
SELECT count(*) as mycounter
FROM abcd
WHERE text = matchesRegex('cid: (\d)')
```

The functions "exists" and "doesNotExist" identify items that either contain, or do not contain, a specified field. For example, a user query 302 including a parameter "event_type=exist( )" identifies items having the "event_type" field. An example of a user query 302 including the "startsWith" function is as follows:

```
SELECT source
FROM abcd
WHERE event_type = exist( )
```

User query 302 is provided to the management plane 220 of the distributed-computing system. When user query 302 is received at the management plane 220, the user query 302 is parsed into individual parsed expressions 304 at block 350. The parsed expressions 304 represent each of the search parameters in the user query 302.

At block 355, the expressions are assigned to be either native operations 306 or post-processing operations 308. The expression assignment at block 355 is performed by building a parse tree of the parsed expressions 304, as further described in reference to FIGS. 4A-4B. Process 300 provides an initial assignment for the expressions 304 by identifying whether each expression can be executed by the database platform (e.g., a native operation 306) or whether post-processing is required to execute the expression (e.g., a post-processing operation 308). In some embodiments, an expression is reassigned from a native operation 306 to a post-processing operation 308 based on the structure of the parse tree, as further described in reference to FIGS. 4A-4B. A database platform implemented in a data plane is typically more efficient at executing queries than the nodes of a management plane, so the goal when assigning the expressions 304 is to maximize the amount of native operations 306 that can be executed by the database platform.

Once the native operations 306 and post-processing operations 308 are identified, process 300 generates a database query 310 at block 360 and a post-processing query 312 at block 365. The database query 310 is a query that combines the native operations 306 into a format that can be sent to the data plane 230 for execution by the database platform. Similarly, the post-processing query 312 is a query that combines the post-processing operations 308 into a format that can be executed by the management plane 220 on the results from the database platform.

At block 370, the database query 310 is executed by the database platform. When the database platform executes the database query 310, the database platform locates items in the data plane 230 as specified by the database query 310. These items are then provided to the management plane 220 as database results 314.

At block 375, the post-processing query 312 is executed by the management plane 220 on the database results 314. In some embodiments, the management plane 220 executes the post-processing query 312 by filtering the database results 314 as specified by the post-processing query 312. In some embodiments, the database results 314 are provided from the data plane 230 as rows of data, and the management plane executes the post-processing query 312 by evaluating each row of data with the post-processing query and omitting any row that does not satisfy the post-processing query 312. Once the post-processing query 312 has been executed, the management plane 220 provides user query results 316. The user query results 316 include items as requested by the user query 302.

An example of a user query 302 including expressions that can be executed by a database platform and expressions which require post-processing is as follows:

```
# query
SELECT text
, dynField
FROM abcd
WHERE dynField = '123'
# dynamic field definition
[{
"fieldName": "dynField",
"sourceField": "text",
"regex": "thread id: (?<dynField>(\\d+))",
"type": "INTEGER"
}]
```

This user query is split into a native operation that selects items in the database platform matching a portion of the regex specified by the dynamic field (e.g., text="thread id:"), and a post-processing operation that does additional filtering on the results identified by the native operation by extracting the dynamic field from the results and matching it to the specified value (e.g., dynField="123").

Figure 4A:
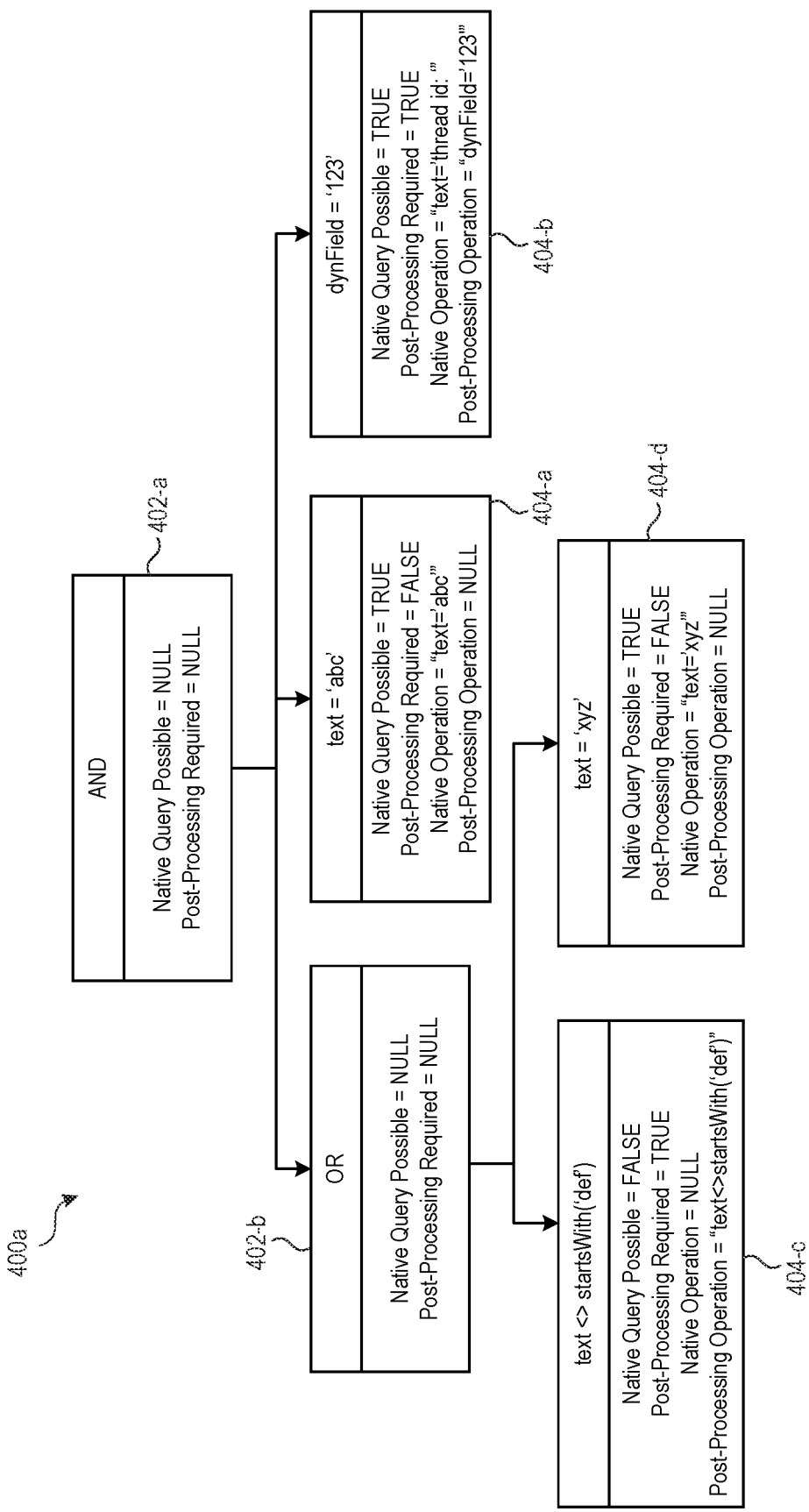
FIG. 4A illustrates an example of a parse tree, in accordance with some embodiments.

As noted above, expressions parsed from the user query 302 are assigned to be either native operations 306 or post-processing operations 308 by building a parse tree of the parsed expressions 304. FIG. 4A illustrates an example of a parse tree 400a, in accordance with some embodiments. The parse tree 400a is built from the following exemplary user query:

```
# query
SELECT text
, dynField
FROM abcd
WHERE dynField = '123'
AND text = 'abc'
AND (
text <> startsWith('def')
OR
text = 'xyz'
)
# dynamic field definition
[{
"fieldName": "dynField",
"sourceField": "text",
"regex": "thread id: (?<dynField>(\\d+))",
"type": "INTEGER"
}]
```

Each node in the parse tree 400a represents a respective expression parsed from the user query 302. The parse tree 400a includes two types of nodes—Boolean nodes 402 and operation nodes 404. Each node is associated with a "Native Query Possible" and "Post-Processing Required" indicator. Each operation node 404 is also associated with a corresponding native operation and/or post-processing operation. The "Native Query Possible" indicator indicates that the corresponding node represents one of a plurality of predetermined expressions that can be executed by the database platform. The "Post-Processing Required" indicator indicates that the corresponding node represents one of a plurality of predetermined expressions that cannot be executed by the database platform. These indicators are initially populated for each of the operation nodes 404 as shown in FIG. 4A. The indicators for the Boolean nodes 402 are not populated until the parse tree 400a is evaluated, as described below in reference to FIG. 4B.

As shown in FIG. 4A, operation node 404-c representing expression "text< >startsWith('def')" is initially populated with the indicators "Native Query Possible=FALSE" and "Post-Processing Required=TRUE" because the "startsWith" function cannot be executed by the database platform. On the other hand, operation node 404-d representing expression "text='xyz'" is initially populated with the indicators "Native Query Possible=TRUE" and "Post-Processing Required=FALSE" because the database platform is capable of executing a query for "text='xyz'".

The user query specifies that the results from operation nodes 404-c and 404-d are combined with an OR operator, as represented by Boolean node 402-b. However, if the expression represented by operation node 404-d is evaluated separately from the expression represented by operation node 404-c (e.g., "text='xyz'" is evaluated first by the database platform, and then "text< >startsWith('def')" is evaluated later by the management plane after the database platform provides results), then the obtained results would not satisfy the criteria represented by the OR operator, as specified by the parse tree 400a. For example, evaluating the expression of operation node 404-d at the database platform retrieves results that only satisfy the criterion of operation node 404-d ("text='xyz'"). The retrieved results would be missing data items that satisfy the criterion of operation node 404-c ("text< >startsWith('def')"). Subsequently applying the expression of operation node 404-d to the retrieved results as a separate post-processing operation would further filter out results that do not satisfy the criterion of operation node 404-d ("text< >startsWith('def')"). Thus, the final results obtained from separately evaluating operation nodes 404-c and 404-d do not satisfy the union criteria represented by the OR operation. To overcome this problem, the indicators for operation node 404-*d* can be reassigned, as shown in FIG. 4B.

On the other hand, when results for operation nodes 404 are combined with an AND Boolean node 402 (e.g., Boolean node 402-*a*), the expressions represented by the operation nodes 404 can be evaluated separately (e.g., expression "text='abc'" represented by operation node 404-*a* can be evaluated by the database platform and expression "dynField='123'" represented by operation node 404-*b* can be evaluated separately by the management plane, then the two sets of results can be ANDed together). In particular, unlike the OR operation, the AND operation represents an intersection of two criteria. This enables, for example, the expressions of operation nodes 404-*a* and 404-*b* to be evaluated separately. In particular, evaluating the expression of operation node 404-*a* at the database platform retrieves results that only satisfy the criterion of operation node 404-*a* ("text='abc'"). Subsequently applying the expression of operation node 404-*b* to the retrieved results as a separate post-processing operation would further filter out results that do not satisfy the criterion of operation node 404-*b* ("dynField='123'"). Thus, the final results obtained from separately evaluating operation nodes 404-*a* and 404-*b* satisfies the intersection criteria represented by the AND operation.

Figure 4B:
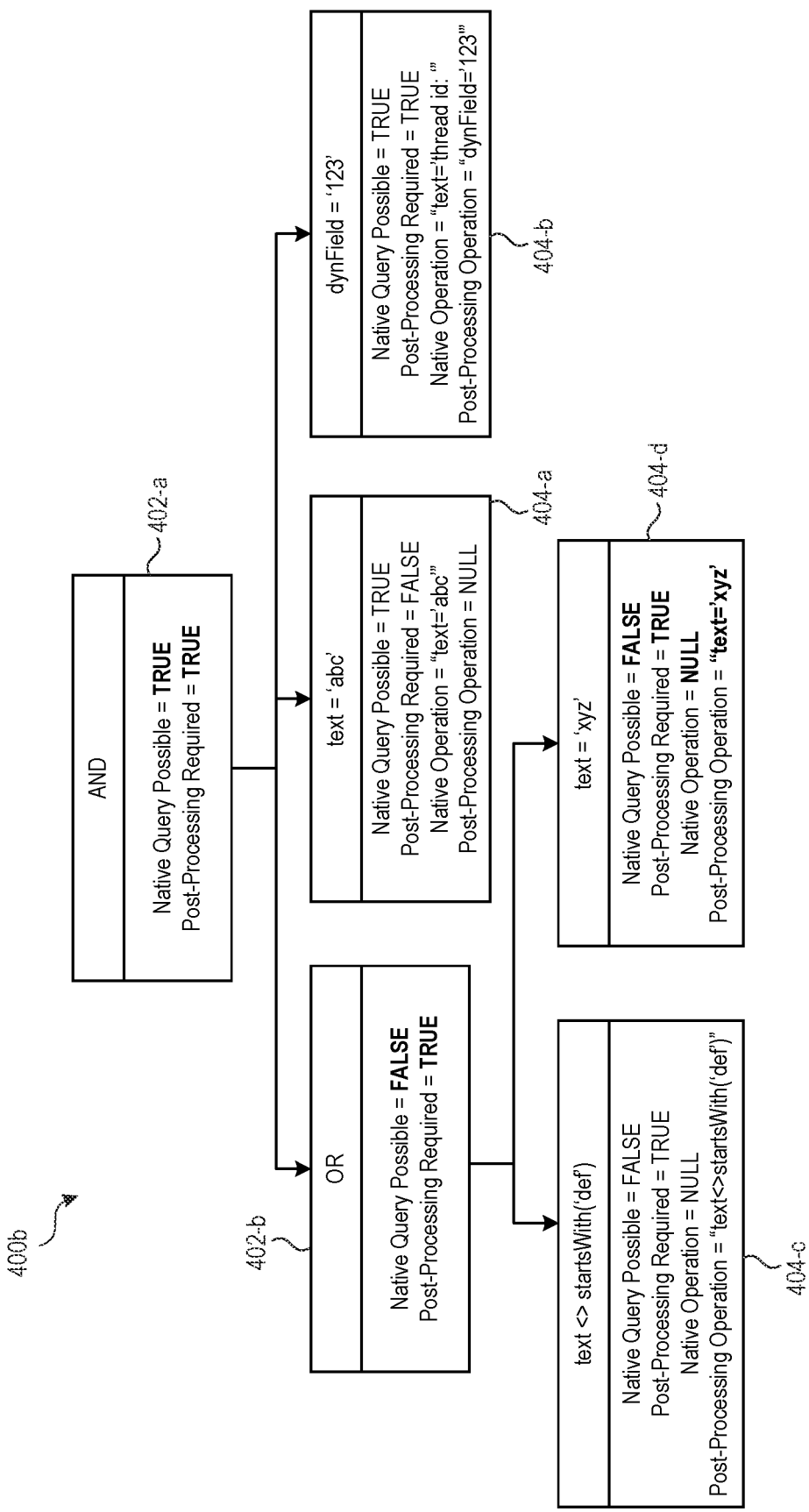
FIG. 4B illustrates an example of a parse tree after the evaluation of Boolean nodes, in accordance with some embodiments.

FIG. 4B illustrates an example of a parse tree 400*b* after the evaluation of Boolean nodes 402, in accordance with some embodiments. As shown in FIG. 4B, the indicators for operation node 404-*d* have been reassigned to "Native Query Possible=FALSE" and "Post-Processing Required=TRUE". This is due to operation node 404-*d* being ORed with another operation node 404-*c* having the indicators "Native Query Possible=FALSE" and "Post-Processing Required=TRUE", as described in reference to FIG. 4A. More generally, when an initial parse tree (e.g., parse tree 400*a* shown in FIG. 4A) is evaluated, if any leaf operation node 404 under an OR Boolean node 402 has a "Native Query Possible=FALSE" indicator, then all other leaf operation nodes 404 under the OR Boolean node 402 are reassigned to also have "Native Query Possible=FALSE" indicators, as shown in parse tree 400*b* of FIG. 4B. Similarly, if any leaf operation node 404 under an OR Boolean node 402 has a "Post-Processing Required=TRUE" indicator, then all other leaf operation nodes 404 under the OR Boolean node 402 are reassigned to also have "Post-Processing Required=TRUE" indicators.

Once the "Native Query Possible" and "Post-Processing Required" indicators for the operation nodes 404 have been evaluated, the indicators for the Boolean nodes 402 are populated, as shown in FIG. 4B. The parse tree 400*b* is then used to generate the database query 310 and post-processing query 312, as described in reference to FIG. 3. For example, the database query 310 is generated by doing a leaf-to-root traversal of nodes having "Native Query Possible=TRUE" indicators, and the post-processing query is generated by a leaf-to-root traversal of nodes having "Post-Processing Required=TRUE" indicators. An example of a resulting database query and a resulting post-processing query are shown below:

```
# Database query
(
( text:"abc" )
AND
( text:"thread id: ")
```

```
)
# Post-processing query
(
( text <> startsWith('def')
OR
text='xyz'
)
AND
dynField='123'
)
```

Note that in the above database query, the "text='thread id:'" operation was provided by the dynamic field definition in the original user query. Also note that the above post-processing query does not include the "text='abc'" operation.

Figure 5A:
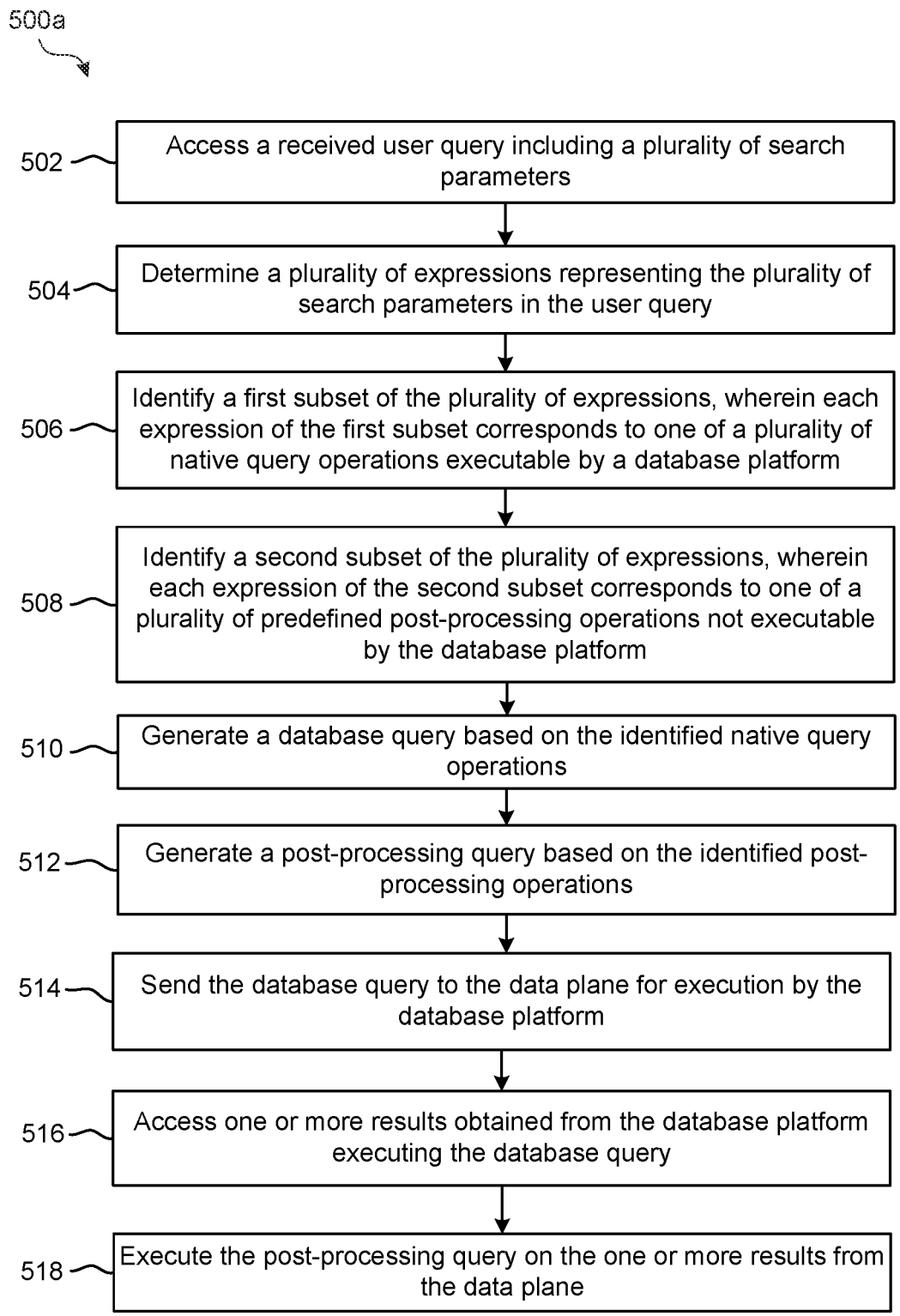
FIG. 5A illustrates a flowchart of exemplary process for splitting a user query into native query operations and post-processing operations for execution, in accordance with some embodiments.

FIG. 5A illustrates a flowchart of exemplary process 500*a* for splitting a user query into native query operations and post-processing operations for execution, in accordance with some embodiments. Process 500*a* is performed, for example, using a distributed-computing system (e.g., distributed-computing system 200 described in reference to FIG. 2),In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, a management plane (e.g., management plane 220) and a data plane (e.g., data plane 230). In some embodiments, the operations of process 500*a* are distributed across the various components (e.g., management plane, data plane, etc.) of the distributed-computing system. In process 500*a*, some blocks are, optionally, combined, the order of some blocks is, optionally, changed, and some blocks are, optionally, omitted. In some embodiments, additional operations may be performed in combination with process 500*a*.

At block 502, a received user query is accessed at a management plane (e.g., management plane 220) of a distributed-computing system. The user query includes a plurality of search parameters.

At block 504, a plurality of expressions representing the plurality of search parameters in the user query are determined. In some embodiments, determining the plurality of expressions further includes parsing the user query to generate a parse tree (e.g., parse tree 400*b* described in reference to FIG. 4B) having a plurality of nodes. Each node of the plurality of nodes represents a respective expression of the plurality of expressions. In some embodiments, each of the plurality of expressions represents a query condition, a query predicate, a query clause, a query operator, a query statement, or a combination thereof.

At block 506, a first subset of the plurality of expressions is identified. Each expression of the first subset corresponds to one of a plurality of native query operations executable by a database platform implemented on a data plane (e.g., data plane 230) of the distributed-computing system. In some embodiments, the data plane is implemented by one or more data plane containers (e.g., data plane containers 232). In some embodiments, each of the one or more data plane containers include one or more data cores (e.g., data cores 234, 236, 238) storing information for the database platform.

At block 508, a second subset of the plurality of expressions is identified. Each expression of the second subset corresponds to one of a plurality of predefined post-processing operations not executable by the database platform. In some embodiments, the first subset and the second subset each include a same expression of the plurality of expressions. In some embodiments, each expression of the second subset represents a respective criterion that cannot be satisfied by any of the plurality of native query operations.

At block 510, a database query is generated based on one or more expressions of the first subset. The database query corresponds to one or more of the plurality of native query operations executable by the database platform. In some embodiments, the total number of expressions in the one or more expressions used to generate the database query is less than the total number of expressions in the first subset. In some embodiments, generating the database query includes combining two or more expressions of the first subset.

At block 512, a post-processing query is generated based on each expression in the second subset. The post-processing query corresponds to one or more of the plurality of predefined post-processing operations not executable by the database platform. In some embodiments, generating the post-processing query includes combining each expression of the second subset. In some embodiments, the post-processing query is generated using each expression in the second subset and one or more expressions of the first subset.

At block 514, the database query is sent to the data plane for execution by the database platform.

At block 516, one or more results obtained from the database platform executing the database query are accessed.

At block 518, the post-processing query is executed on the one or more results from the data plane. In some embodiments, executing the post-processing query includes filtering the one or more results from the data plane according to one or more criteria represented by the second subset. In some embodiments, when the one or more results from the data plane include a plurality of rows of data, executing the post-processing query includes evaluating each row of the plurality of rows of data with the post-processing query, and omitting at least one row of data based on the evaluation. In some embodiments, the one or more results include one or more log event records generated by an information processing system.

Figure 5B:
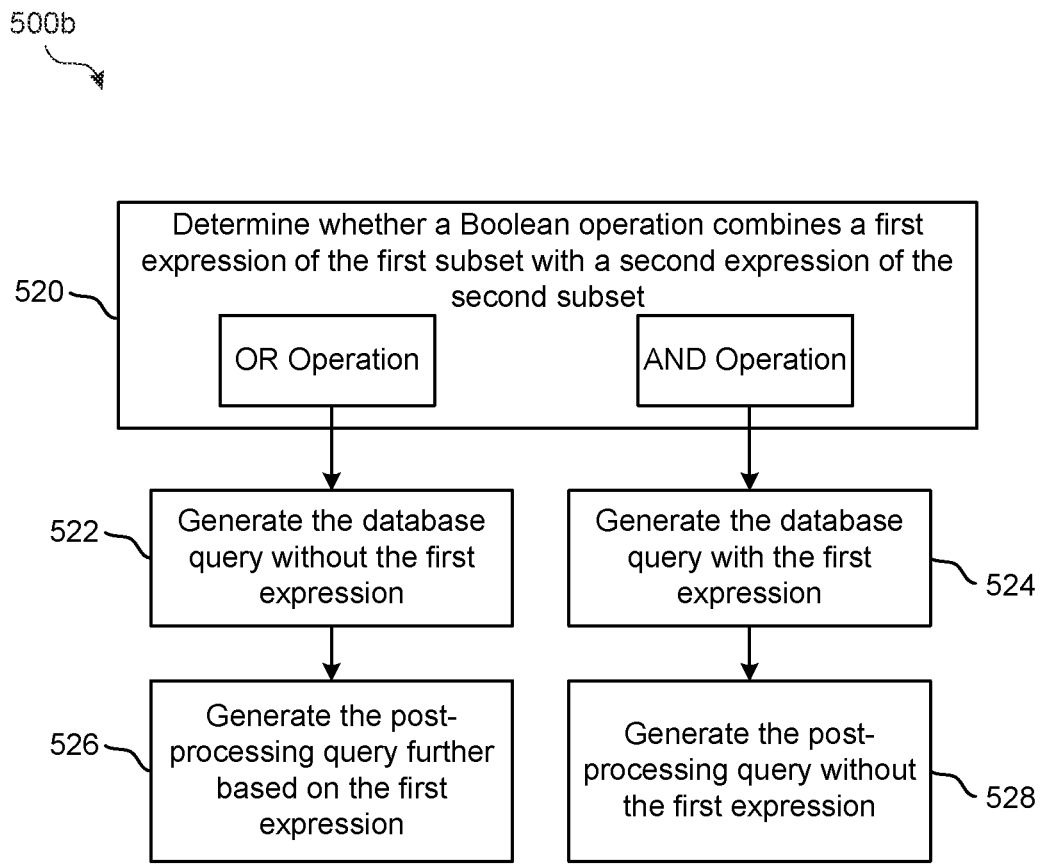
FIG. 5B illustrates a flowchart of exemplary process for generating the database query and post-processing query, in accordance with some embodiments.

FIG. 5B illustrates a flowchart of exemplary process 500b for generating the database query and post-processing query, in accordance with some embodiments. Process 500b is performed in combination with process 500a using the distributed-computing system described in reference to FIG. 5A.

At block 520, process 500b determines whether a Boolean operation combines a first expression of the first subset with a second expression of the second subset.

At block 522, in accordance with a determination that a first Boolean operation (e.g., an OR operation) combines the first expression with the second expression, the database query is generated without the first expression. In some embodiments, identifying the first subset of the plurality of expressions as performed at block 506 of FIG. 5A includes assigning a first indicator to each expression of the first subset. In accordance with the determination that the first Boolean operation (e.g., the OR operation) combines the first expression with the second expression, a second indicator is assigned to the first expression in lieu of the first indicator. In some embodiments, none of the one or more expressions of the first subset have been assigned the second indicator prior to generating the database query.

At block 524, in accordance with a determination that a second Boolean operation (e.g., an AND operation) combines the first expression with the second expression, the database query is generated with the first expression.

At block 526, when the second subset does not include the first expression, and in accordance with the determination that the first Boolean operation (e.g., the OR operation) combines the first expression with the second expression, the post-processing query is generated further based on the first expression.

At block 528, when the second subset does not include the first expression, and in accordance with the determination that the second Boolean operation (e.g., the AND operation) combines the first expression with the second expression, the post-processing query is generated without the first expression.

While processes 500a and 500b are described in the context of a distributed-computing system implementing a database platform, it should be understood that processes 500a and 500b can be applied to other implementations of a database platform, such as a database platform implemented on a single server or local computer.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for splitting a query into native query operations and post-processing operations for execution, the method comprising:
at a management plane of a distributed-computing system:
receiving a user query including a plurality of search parameters;
determining a plurality of expressions representing the plurality of search parameters in the user query;
identifying a first subset of the plurality of expressions, wherein each expression of the first subset corresponds to one of a plurality of native query operations executable by a database platform implemented on a data plane of the distributed-computing system;
identifying a second subset of the plurality of expressions, wherein each expression of the second subset corresponds to one of a plurality of predefined post-processing operations not executable by the database platform;
identifying a first expression in the first subset corresponding to a first operation that is executable with a post-processing operation;
generating a database query based on one or more expressions of the first subset, wherein the database query corresponds to one or more of the plurality of native query operations executable by the database platform;
generating a post-processing query based on at least the first expression in the first subset and each expression in the second subset, wherein the post-processing query corresponds to at least the first operation and one or more of the plurality of predefined post-processing operations not executable by the database platform;

sending the database query to the data plane for execution by the database platform;

receiving, from the data plane, one or more results obtained from the database platform executing the database query; and executing the post-processing query on the one or more results from the data plane.

2. The method of claim 1,
wherein a first Boolean operation combines the first expression of the first subset with a second expression of the second subset; and
wherein the database query is generated without the first expression.

3. The method of claim 2, wherein identifying the first subset of the plurality of expressions further comprises assigning a first indicator to each expression of the first subset, and wherein the method further comprises:
in accordance with the determination that the first Boolean operation combines the first expression with the second expression, assigning a second indicator to the first expression in lieu of the first indicator.

4. The method of claim 3, wherein none of the one or more expressions of the first subset have been assigned the second indicator prior to generating the database query.

5. The method of claim 1, wherein the first subset and the second subset each include a same expression of the plurality of expressions.

6. The method of claim 1, wherein each expression of the second subset represents a respective criterion that cannot be satisfied by any of the plurality of native query operations.

7. The method of claim 1, wherein determining the plurality of expressions further comprises:
parsing the user query to generate a parse tree having a plurality of nodes, wherein each node of the plurality of nodes represents a respective expression of the plurality of expressions.

8. The method of claim 1, wherein the total number of expressions in the one or more expressions used to generate the database query is less than the total number of expressions in the first subset.

9. The method of claim 1, wherein generating the database query comprises combining two or more expressions of the first subset.

10. The method of claim 1, wherein generating the post-processing query comprises combining each expression of the second subset.

11. The method of claim 1, wherein executing the post-processing query comprises:
filtering the one or more results from the data plane according to one or more criteria represented by the second subset.

12. The method of claim 1, wherein the one or more results from the data plane comprise a plurality of rows of data, and wherein executing the post-processing query comprises:
evaluating each row of the plurality of rows of data with the post-processing query; and
omitting at least one row of data based on the evaluation.

13. The method of claim 1, wherein each of the plurality of expressions represents a query condition, a query predicate, a query clause, a query operator, a query statement, or a combination thereof.

14. The method of claim 1, wherein the data plane is implemented by one or more data plane containers.

15. The method of claim 14, wherein each of the one or more data plane containers include one or more data cores storing information for the database platform.

16. The method of claim 1, wherein the one or more results include one or more log event records generated by an information processing system.

17. A distributed-computing system for splitting a query into native query operations and post-processing operations for execution, comprising:
one or more processors; and
memory storing one or more programs configured to be executed by the one or more processors, the one or more programs including instructions for:
at a management plane of the distributed-computing system:
accessing a received user query including a plurality of search parameters;
determining a plurality of expressions representing the plurality of search parameters in the user query;
identifying a first subset of the plurality of expressions, wherein each expression of the first subset corresponds to one of a plurality of native query operations executable by a database platform implemented on a data plane of the distributed-computing system;
identifying a second subset of the plurality of expressions, wherein each expression of the second subset corresponds to one of a plurality of predefined post-processing operations not executable by the database platform;
identifying a first expression in the first subset corresponding to a first operation that is executable with a post-processing operation;
generating a database query based on one or more expressions of the first subset, wherein the database query corresponds to one or more of the plurality of native query operations executable by the database platform;
generating a post-processing query based on at least the first expression in the first subset and each expression in the second subset, wherein the post-processing query corresponds to at least the first operation and one or more of the plurality of predefined post-processing operations not executable by the database platform;
providing the database query to the data plane for execution by the database platform;
accessing one or more results obtained from the database platform executing the database query; and
executing the post-processing query on the one or more results from the data plane.

18. The distributed-computing system of claim 17, wherein
a first Boolean operation combines the first expression of the first subset with a second expression of the second subset; and
wherein the database query is generated without the first expression.

19. A non-transitory computer-readable storage medium storing one or more programs configured to be executed by one or more processors, the one or more programs including instructions for:
at a management plane of a distributed-computing system:
accessing a received user query including a plurality of search parameters;
determining a plurality of expressions representing the plurality of search parameters in the user query;

identifying a first subset of the plurality of expressions, wherein each expression of the first subset corresponds to one of a plurality of native query operations executable by a database platform implemented on a data plane of the distributed-computing system;

identifying a second subset of the plurality of expressions, wherein each expression of the second subset corresponds to one of a plurality of predefined post-processing operations not executable by the database platform;

identifying a first expression in the first subset corresponding to a first operation that is executable with a post-processing operation;

generating a database query based on one or more expressions of the first subset, wherein the database query corresponds to one or more of the plurality of native query operations executable by the database platform;

generating a post-processing query based on at least the first expression in the first subset and each expression in the second subset, wherein the post-processing query corresponds to at least the first operation and one or more of the plurality of predefined post-processing operations not executable by the database platform;

providing the database query to the data plane for execution by the database platform;

accessing one or more results obtained from the database platform executing the database query; and executing the post-processing query on the one or more results from the data plane.

20. The non-transitory computer-readable storage medium of claim 19, wherein a first Boolean operation combines the first expression of the first subset with a second expression of the second subset; and wherein the database query is generated without the first expression.

* * * * *